April 28, 1931. H. M. SWARTLEY 1,803,041
WEIGHING DEVICE FOR VEHICLES
Filed Jan. 31, 1930 2 Sheets-Sheet 1
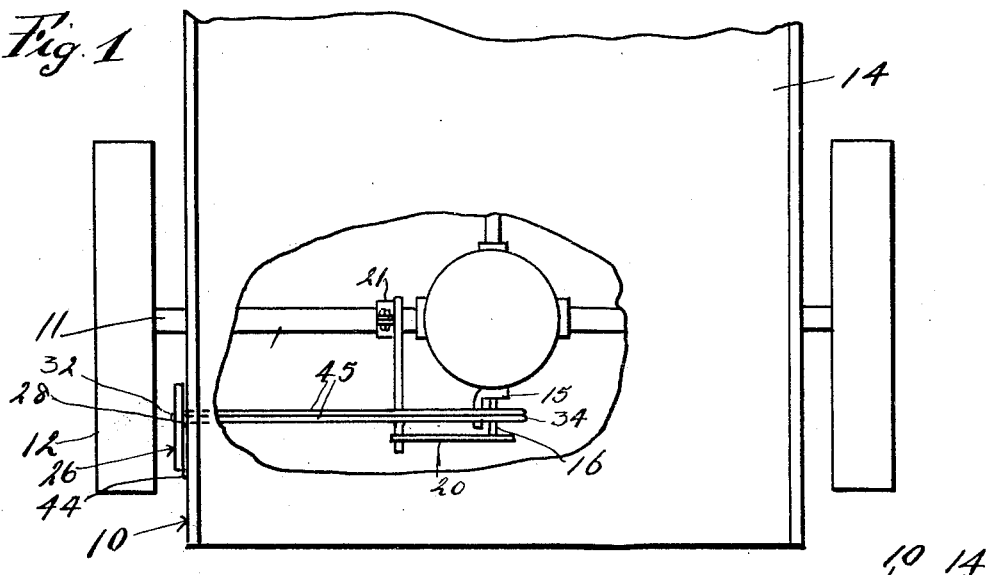
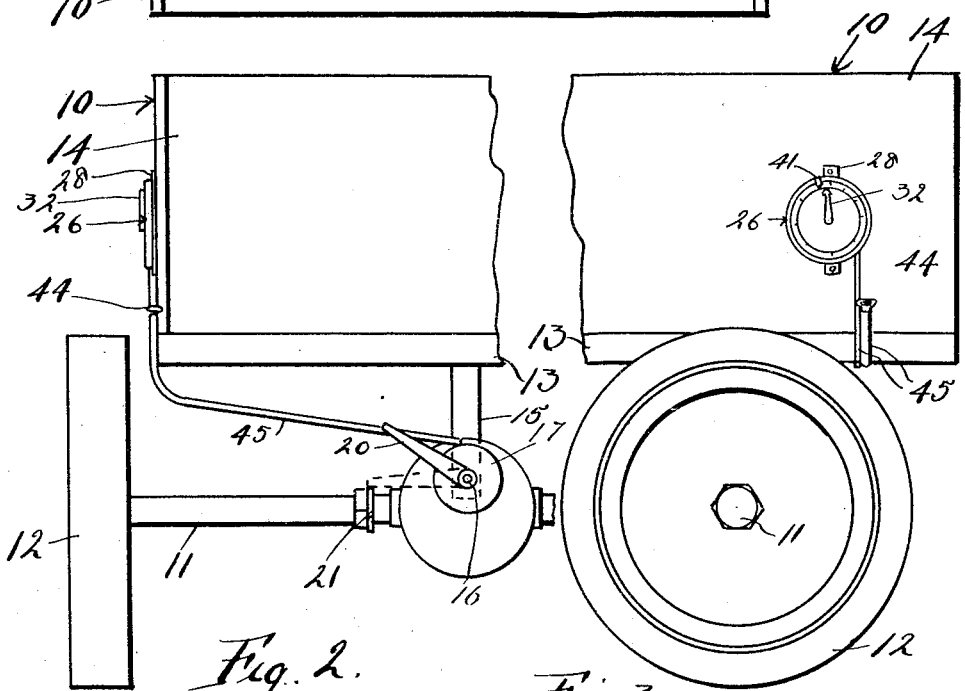
INVENTOR
Harry M. Swartley
By W. W. Williamson Atty.

April 28, 1931.  H. M. SWARTLEY  1,803,041
WEIGHING DEVICE FOR VEHICLES
Filed Jan. 31, 1930  2 Sheets-Sheet 2
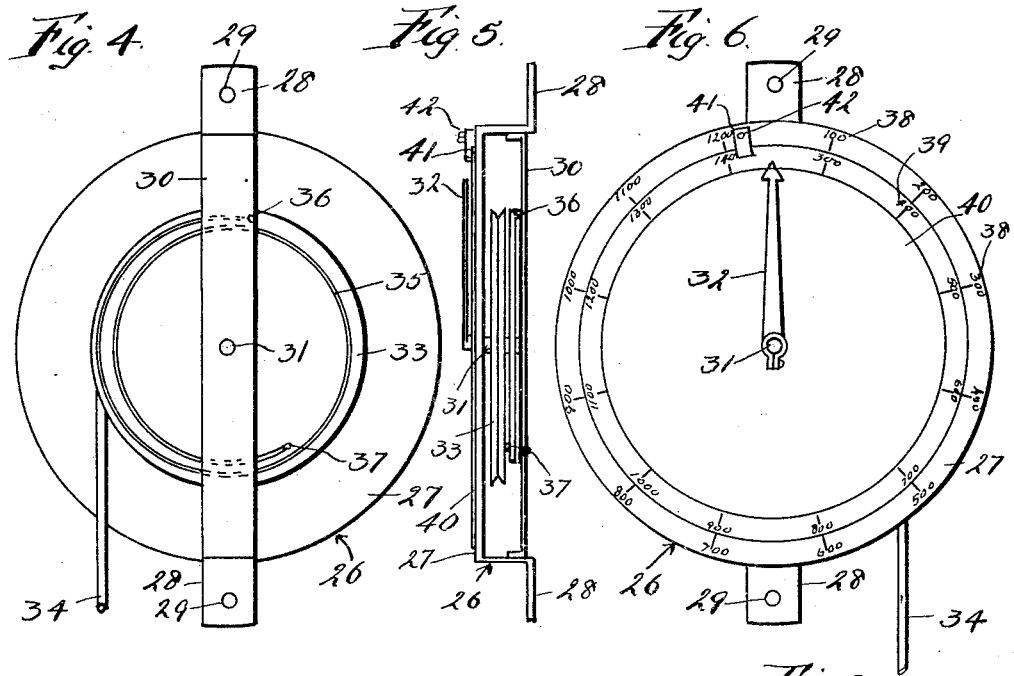
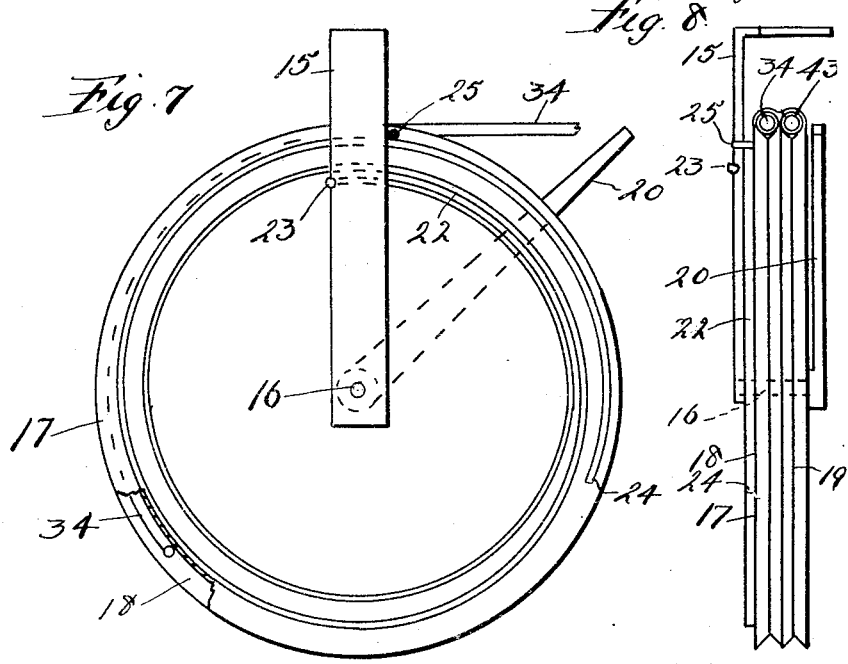
INVENTOR.
Harry M. Swartley
By W. W. Williamson
Atty.

Patented Apr. 28, 1931

1,803,041

UNITED STATES PATENT OFFICE

HARRY M. SWARTLEY, OF ROXBOROUGH, PENNSYLVANIA

WEIGHING DEVICE FOR VEHICLES

Application filed January 31, 1930. Serial No. 424,774.

My invention relates to new and useful improvements in a weighing device for vehicles, and has for one of its objects to improve the invention disclosed in my Patents No. 1,584,489, dated May 11, 1926 and No. 1,734,751, dated November 5, 1929, whereby the apparatus is used or operated only when a weight indication is desired, thereby eliminating the constant wear upon the parts of the device as a vehicle is traveling.

Another object of the invention is to provide for automatically disengaging the parts of the operating mechanism after the same has been actuated to obtain a weight indication.

A further object of the invention is to provide an improved motion transmitting means for a device of this character in order to obtain at all times an accurate indication of the weight of the load or the combined weight of the load and vehicle.

A still further object of the invention is to provide an indicating mechanism or structure similar to that shown in my former patents or a slight variation thereof and to mount a grooved pulley or equivalent means on a shaft of the indicating mechanism; to provide an operating mechanism similar to that shown in my Patent No. 1,734,751, and provide the same with a grooved pulley or equivalent thereof; to attach ends of a spring, rope, wire or other flexible means or equivalent cable to the pulleys whereby motion will be transmitted from the operating mechanism to the indicating mechanism and to provide means for manually rotating the pulley of the operating mechanism to permit of a weight indication on the weight mechanism, said parts being returned to their normal inoperative positions upon release of the means by which the operating mechanism is manually actuated.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1, is a fragmentary plan view showing the rear end of the vehicle with my improved weighing device connected therewith, a portion of the bottom of the vehicle body being broken away to clearly illustrate the location and relation of the several parts.

Fig. 2, is a fragmentary end view of the same.

Fig. 3, is a fragmentary side elevation thereof.

Fig. 4, is an enlarged rear elevation of the indicating mechanism.

Fig. 5, is an edge view thereof.

Fig. 6, is a front face view of the same.

Fig. 7, is an enlarged rear face view of the operating mechanism with a portion of the pulley broken away to show one of the grooves to receive a cable and showing in dotted lines the position of the arm for obtaining a weight indication.

Fig. 8, is an edge view of Fig. 7.

In carrying out my invention as herein embodied, 10 represents a vehicle including a rear axle 11 mounted on wheels 12 and also mounted on said axle is the frame or chassis 13 carrying the body or box 14 which may be of the stationary or dumping type and hereafter the frame or chassis and the body or box will be considered together as the body and of course it will be understood that wherever the word "axle" is used, it includes the stationary part thereof whether it be the casing or the differential housing or a beam acting as a part of an axle.

From the underside of the body depends a hanger 15 which carries at its lower end a trunnion 16 either stationary or rotatable and on this trunnion is mounted a pulley 17 or its equivalent preferably provided with two peripherial grooves 18 and 19, although it is to be understood that two separate pulleys or equivalent devices may be utilized.

An arm 20 is mounted for movement with the pulley 17 and therefore if said pulley is rotatable upon the trunnion, said arm 20 is connected directly to such pulley but where the pulley is movable with the trunnion, then said arm 20 may be mounted directly upon the trunnion. The arm 20 is adapted to co-operate with a stop 21 projecting from some suitable portion of the rear axle or rear axle assembly so that the movement of said arm and associated parts are conditioned upon the positions of the trunnion 16 and the stop 21 relative to each other, therefore when the body is depressed relative to the axle, the movement of the arm to bring the same in contact with the stop 21 is less than when the body is in, what might be termed, its normal position.

The arm 20 is normally held in an inoperative position, in this case an elevated position, by a spring 22 or its equivalent, the same preferably being of the coiled type with one end anchored at 23 on the bracket or hanger 15 as stationary element and the other end connected at 24 to the pulley 17 as the movable element and the movement of said arm by the spring is limited by a stop pin 25, carried by some suitable part of the operating mechanism, such as the pulley 17 as herein illustrated, Figs. 7 and 8, or by the arm 20 or even by one or both of the cables to be presently described, the said stop pin coacting with some stationary element, such as the bracket 15 at the end of the movement. The hanger 15, the pulley 17 and the arm 20 with their associated and component parts are to be considered as the operating mechanism.

The indicating mechanism 26 includes a stationary dial 27 provided with feet 28 having holes 29 therein for passage of fastening devices by which the entire indicating mechanism or structure may be secured to a suitable support and more particularly the body of the vehicle. It will be understood that said feet might be formed on a frame member to which the stationary dial is secured. To the feet is secured a bearing strip 30 in which is journalled one end of the shaft 31 while the other end of said shaft is journalled in the stationary dial or an equivalent support and this shaft in addition to carrying the indicating hand 32 has a pulley 33 or its equivalent mounted thereon for movement therewith. Said pulley, shaft and indicating hand are normally moved clockwise by the operating mechanism through the medium of a cable 34, one end of which is wound on the pulley 17 within one of its grooves and fastened in place while the other end is wound upon the pulley 33 with its end fixed in the groove of said pulley whereby said indicating hand will be normally held or returned to the zero position indicated in Fig. 6.

The pulley 33, shaft 31 and pointer hand 32 are moved counter clockwise when the cable 34 is slackened by a spring 35 preferably of the coiled type having one end anchored at 36 to the bearing strip 30 as the stationary element while the other end is attached at 37 to the pulley 33 as the movable element and said indicator hand will move only a distance equal to the slack in the cable which slack is controlled by the movement of the operating mechanism necessary to bring the arm 20 into contact with the stop 21 and the distance between the arm 20 and stop 21 is regulated in the first instance by the compression of the vehicle springs or the depression of the vehicle body relative to the axle on which the stop 21 is mounted.

The indicator hand 32 co-operates with numerals 38 on the face of the stationary dial 27 to indicate the weight of the load in the vehicle due to the depression of the vehicle body and said hand also co-operates with numerals 39 on the secondary or movable dial 40 which is journalled on the shaft 31 so as to be revolved thereabout and when the required adjustment of the secondary dial is obtained, it may be held stationary by a clamp 41 connected with the stationary dial by a screw 42, the nose of said clamp overlapping the secondary dial to pull it against the stationary dial when the screw is drawn up. The secondary dial is used for indicating the combined weight of the vehicle and its load so that if the weight of said vehicle is known to be two hundred pounds, as an example, said movable or secondary dial is rotated until the numeral 200 thereon aligns with the zero on the stationary dial and said secondary dial is then clamped in place. It will now be obvious that with any movement of the hand 32 around the dials to a point where the load is indicated as eleven hundred pounds, as an example, then the combined weight of the load and vehicle will be indicated on the secondary dial as thirteen hundred pounds.

In order to actuate the operating mechanism to provide a weight indication on the indicating mechanism, I provide another cable 43 having one end wound on the pulley 17 in the groove 19 and fixed to said pulley while the other end extends to a point in proximity to the indicating mechanism where said cable may be provided with a pull ring 44 or any equivalent so that a person desiring a weight indication may readily grasp the pull ring to actuate the operating mechanism.

It is preferable that the cables be shielded or protected throughout the major parts of their lengths in which case they may run through metal tubes 45.

While I have described my invention with the pulley 33 mounted directly upon the shaft 31 carrying the indicator hand, it will be obvious that if preferable, the pulley 33 could be mounted upon a secondary shaft with a gear train between the two shafts as shown in both of my prior patents mentioned herein without deviating from the fundamental principles of my invention.

The operation of the device is as follows:—

The parts being attached as above described, the indicator 32 will be adjusted upon the shaft 31 until it registers with zero upon the primary or stationary dial. Then when it is desired to obtain a weight indication of the load in the vehicle or the combined weight of said load and the vehicle, the cable 43 is pulled so as to actuate the operating mechanism and rotate the pulley 17 until the arm 20 contacts with the stop 21. The actuation of the operating mechanism in this manner tends to slacken the cable 34 which allows the spring 35 to move the indicating hand 32 counter clockwise a distance equal to the ratio between the pulley 33 and the pulley 17 in proportion to the movement necessary to bring the arm 20 into contact with the stop 21. The weight indication having been obtained, the cable 43 is released and the operating mechanism will be actuated in the opposite direction by means of the spring 22 which will wind up both cables and actuate the indicating mechanism against the action of its spring 35 to return the indicating hand 32 to the zero position.

From the foregoing, it will be obvious that when the device is not actually manually operated to obtain a weight indication, the parts are in inoperative positions and no movement is transmitted from any part to another, thus saving the several elements from unnecessary wear.

Of course I do not wish to be limited to the exact details of construction as herein shown, as these may be varied within the limits of the appended claims without departing from the spirit of my invention.

Having thus fully described my invention, what I claim as new and useful is:—

1. The combination with a vehicle including a body and axle, of a stop fixed to the axle, a hanger fixed to the body, a pulley rotatably supported by said hanger, an arm coactingly connected with said pulley for contact with the stop to regulate the movement of said pulley in one direction in proportion to the depression of the vehicle body relative to the axle, an indicating mechanism including dials having units of weight delineated thereon, an indicating hand, and means to move said indicating hand, a pulley included as a part of said hand moving means, a spring to move the indicating hand in one direction, flexible means connected with the two pulleys for transmitting motion from the first mentioned pulley to the second mentioned one, means to normally move the first mentioned pulley in a direction to move the second mentioned pulley against the action of its spring, and means connected with the first mentioned pulley whereby it may be manually actuated to permit the indicating mechanism to be operated by the spring associated therewith.

2. In a device of the kind described, a hanger depending from the underside of a vehicle body, a pulley rotatably connected with said hanger, an arm associated with said pulley for movement therewith, a stop secured to the axle of the vehicle for regulating the movement of the arm in proportion to the depression of the body relative to the axle, a spring to normally rotate the pulley and arm in that direction which will disengage said arm from the stop, a weight indicating mechanism mounted on the vehicle body including dials, a rotatable hand, and an associated pulley, said hand and pulley rotating in unison, a spring tending to rotate the pulley and hand in one direction, the action of the last named spring being contrary to that of the first mentioned spring, flexible means connected with the pulleys whereby rotation of the first mentioned pulley against the action of its spring will relieve tension on the flexible means and permit the second mentioned spring to operate the indicating mechanism for obtaining a weight indication, and means connected with the pulley of the operating mechanism for manually actuating said operating mechanism to permit the weight indication to be obtained.

3. In a device of the kind described, an operating mechanism including a stop connected with the axle of a vehicle, a pulley supported by the body of the vehicle, an arm for rotation with said pulley and for coaction with said stop, and a spring to rotate the pulley and arm in one direction to normally maintain said arm out of contact with the stop, a weight indicating mechanism supported by the vehicle body and including dials, an indicating hand, a pulley for movement with said indicating hand, and a spring to move the indicating hand and pulley in one direction, flexible means having its ends connected with the pulleys so that when one end is wound upon one pulley by rotation thereof, the other end will be unwound from the other pulley, the spring of the operating mechanism tending to normally move the parts in a direction which will retain the indicating hand in the zero position against the action of the spring of the weight indicating mechanism, and means whereby the pulley of the operating mechanism may be manually operated against the action of its spring to relieve tension on the flexible means and permit the spring of the weight indicating mechanism to function for obtaining a weight indication.

In testimony whereof, I have hereunto affixed my signature.

HARRY M. SWARTLEY.